United States Patent [19]
Collins

[11] 3,748,412
[45] July 24, 1973

[54] CONTROL SYSTEM FOR AUTOMATIC MACHINES

[75] Inventor: George Thomas Collins, Sutton Coldfield, England

[73] Assignee: British Industries Plastics Limited, Manchester, England

[22] Filed: June 10, 1971

[21] Appl. No.: 151,853

[30] Foreign Application Priority Data
July 18, 1970  Great Britain.................. 34,968/70

[52] U.S. Cl. ................................ 200/46, 235/61.7
[51] Int. Cl. .......................................... H01h 43/08
[58] Field of Search.......................... 200/45, 46, 47; 235/61.6, 61.7, 61.11

[56] References Cited
UNITED STATES PATENTS

| | | | |
|---|---|---|---|
| 3,566,052 | 2/1971 | Mindell | 200/46 |
| 3,219,769 | 11/1965 | Lutzen | 200/46 |
| 3,243,532 | 3/1966 | De Bonduwe | 200/46 |
| 3,479,473 | 11/1969 | Ramstetter | 200/46 |
| 3,515,339 | 6/1970 | McEwan | 235/61.7 |

Primary Examiner—Herman J. Hohauser
Attorney—Cushman, Darby & Cushman

[57] ABSTRACT

Sequential operation of an automatic machine is controlled by an assembly of binary switches which are selectively operated by a selector member. Plunger operated microswitches may be used in conjunction with a selector member comprising a stiff apertured plate so that when the plate is pressed against an assembly of switches, it depresses the plungers except the ones located against the apertures and thus makes the selection. Lever-operated microswitches may alternatively be used in conjunction with a selector member having a profiled edge which is shaped to engage some levers and not others when it is brought into operational relationship with the switch array.

5 Claims, 7 Drawing Figures

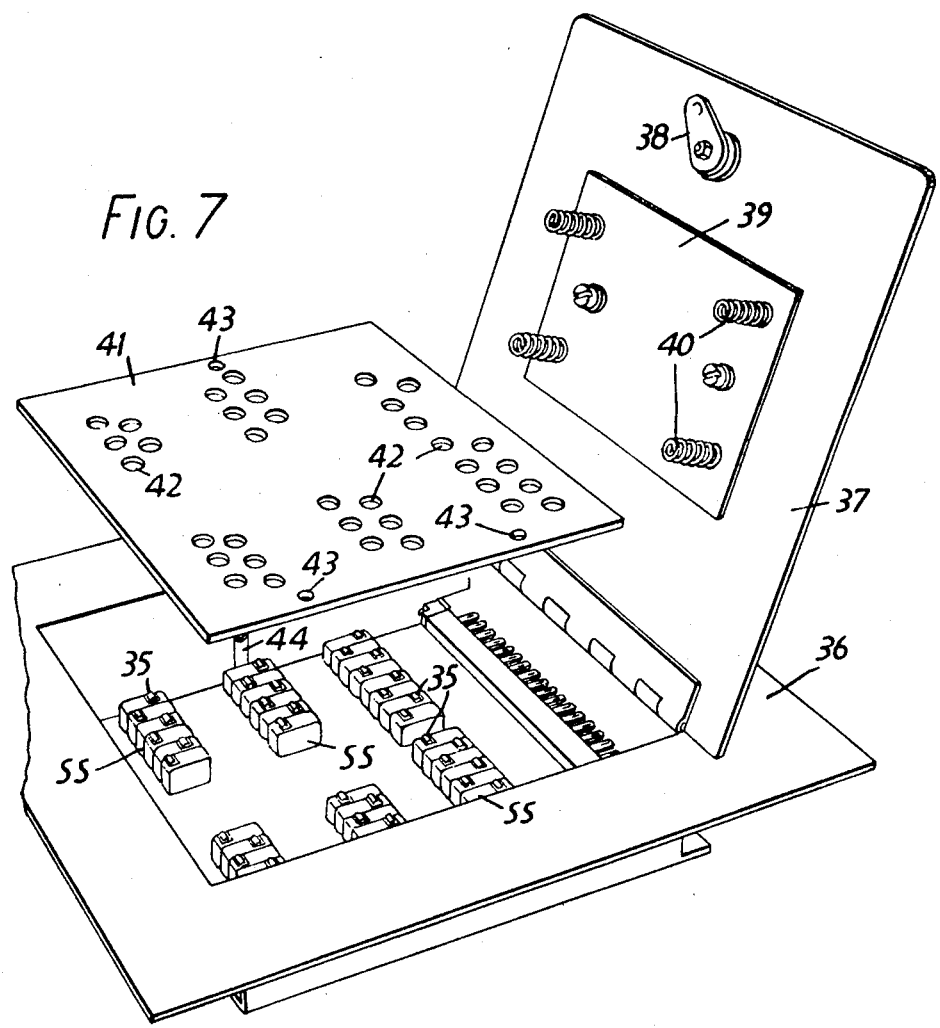

CONTROL SYSTEM FOR AUTOMATIC MACHINES

This invention relates to the control of machines and is particularly concerned with the operation of electrical systems for controlling automatic machines capable of carrying out several different actions.

The operation of such a machine normally involves a number of individual actions which are carried out in a predetermined sequence. For example, the operation of a screw type injection moulding machine for moulding thermoplastics or thermosetting materials involves the opening and closing of mould halves, the plasticising of the material in the barrel of the machine, the rotary and reciprocatory movement of a feed screw, the heating and cooling of the barrel, the heating or cooling of the mould, the cooling of the screw, the movement of the barrel, the ejection of the moulded article, and so on, the mechanical operations all in strict sequence. Not all of these individual actions are required in each case, or the sequence may vary, but the particular actions and the sequence thereof for each individual material and each particular moulding operation will be known in each case.

It is known to control machines such as injection moulding machines electrically, and control systems are usually built up by first of all determining which particular actions the machine is required to perform and in what sequence, and then constructing a circuit which will bring about the performance of these actions in the required sequence. Such circuits may comprise normal electronic equipment, e.g., switching blocks, timing blocks, filters, amplifiers and relays, etc. and the selection of the sequences of operation is achieved by the operation, usually manual, of some form of switching arrangement.

The setting up of a sequence normally involves a number of individual selections being made to set the various selector switches, or pins in a peg board, to the positions which will provide the required sequence of operation. For example, to set a fully automatic sequence in an injection moulding machine requiring core pulling, ejection, sprue break, all of which can take place in a varying order in the sequence of operation, may involve setting six or more selector switches, most of which have four possible settings. Errors can occur in making the selection and these can cause damage to costly moulds, and therefore the operation of setting the sequences can only be carried out by qualified operatives.

It is an object of the present invention to provide a control system for a machine, such as a moulding press, which enables the machine to carry out a desired sequence of a plurality of actions and which can be modified simply and quickly by an unskilled operative with reliability and safety.

According to the present invention, selection means for the control system of an automatic machine comprises a plurality of binary switches arranged to operate the various functions of the machine and a selector member which co-operates with said binary switches and is adapted to operate such of the binary switches as are necessary to achieve a desired selection and/or sequence of the said functions.

The invention also provides an automatic machine having a sequential control system comprising such selection means.

Thus a machine will be provided with a set of selector members, each of which is adapted to operate the requisite binary switches to achieve one particular sequence or selection.

Conventional 'on-off' microswitches are very suitable for use in our invention, being so connected into the machine circuit that the selection is made by some microswitches being depressed and some not. The selector member engages the array of microswitches to operate some of them and thus make the selection. Encapsulated switches are especially suitable for use in moist or dusty environment giving enhanced reliability.

In one form of construction, the microswitches are lever-operated and the selector member takes the form of a card wilh a shaped profile. The microswitches may be mounted in a row so that their operating levers are in line with two slots running at sides of a rack on which the switches are mounted. When a card is inserted into the slots and pushed into the rack beneath the levers of the microswitches selected switches are operated. The leading edge of the card profiled for a particular sequence has areas which are not cut away so that when the card is inserted into the rack the microswitch levers in these areas are depressed and the switches are thus actuated. Where it is required that the card should not actuate a switch, the area of the card which would come in contact with the lever is cut away. The selection of which switches will be operated when the card is inserted is therefore decided by the profile of the leading edge of the card.

In a preferred construction, the microswitches are plunger operated and are arranged with the plungers in a plane. The selector member then may take the form of a card or stiff plate provided with a number of apertures and arranged to be held in contact with the switch array to depress the plungers of all the microswitches except the ones located against the apertures. Thus, with these arrangements the card may be applied to the microswitch array by an unskilled operative, thus actuating the desired microswitches to make the selection. A set of cards provides for the selections of standard sequences and a card giving the correct sequence, say for a particular mould being installed in the machine is issued with the other instructions for operating the mould.

The microswitches can be placed in various positions in the rack so that they are actuated by the card when it is inserted. The card can be inserted above or below the microswitches according to whether the microswitch levers or plungers are positioned above or below the body of the microswitch.

One preferred embodiment of the invention will now be described by way of example with reference to the accompanying drawings in which:

FIG. 1 schematically illustrates an injection moulding machine,

FIG. 7 is a perspective view on a larger scale of the sequence selector unit fitted in the control console of FIG. 2 and included in the circuit of FIG. 3.

Figure 1:
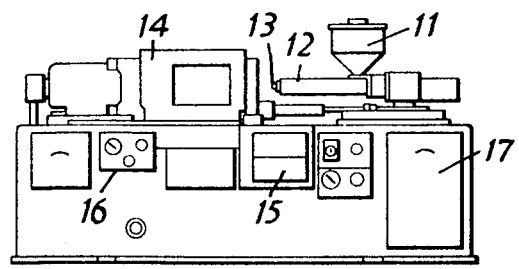

The injection moulding machine as shown in FIG. 1 may be used for moulding plastics materials in a mould having, for example, separable dies. Plastics material is contained in a hopper 11 which feeds a heated screw injection cylinder 12 having an outlet nozzle 13. The screw 12 is driven by hydraulic motors (not shown). An assembly 14 houses a separable mould, one part carried on a fixed platen with an inlet cooperating with the injection nozzle 13, and the other part carried on a reciprocable hydraulic ram operated platen. Manual controls 15 and indicators 16 are shown at the front of the injection moulding machine, and a compartment 17 houses solenoid valves controlling various operations in the injection moulding process.

The injection moulding machine requires only brief description as its construction and operation will be known to those skilled in the art.

Figure 2:
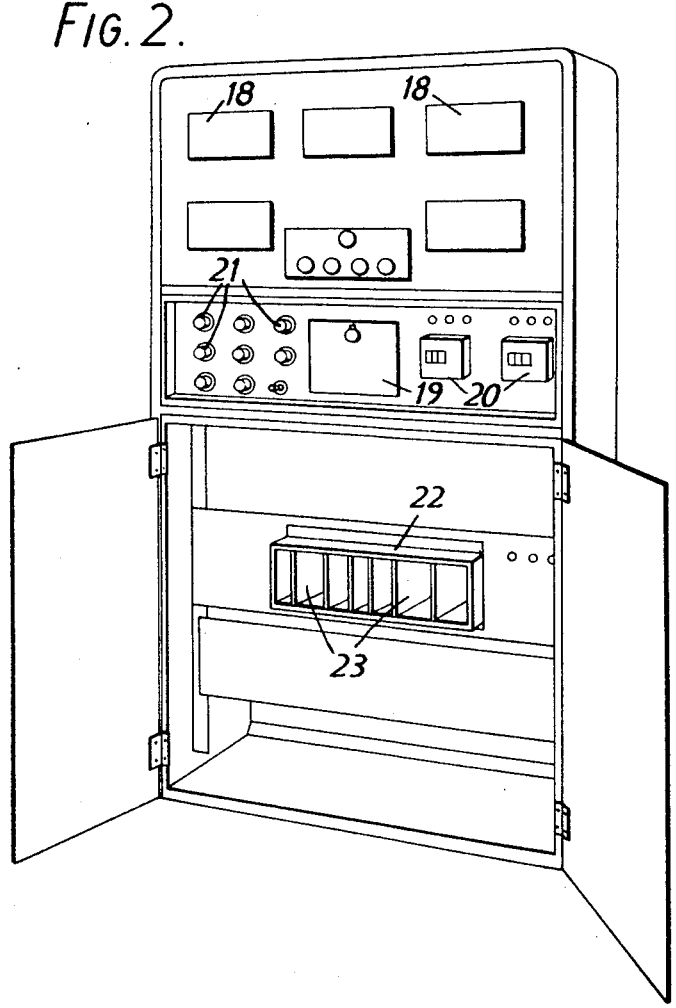
FIG. 2 is a perspective view of a control console for this machine.

A control console is shown in FIG. 2 which generally comprises injection cylinder temperature controllers having dials 18, sequence selector unit 19, digital setting timers 20, settable time delay controls 21 and a rack 22 housing in parallel vertical alignment a plurality of printed circuit boards or cards 23.

Figure 3:
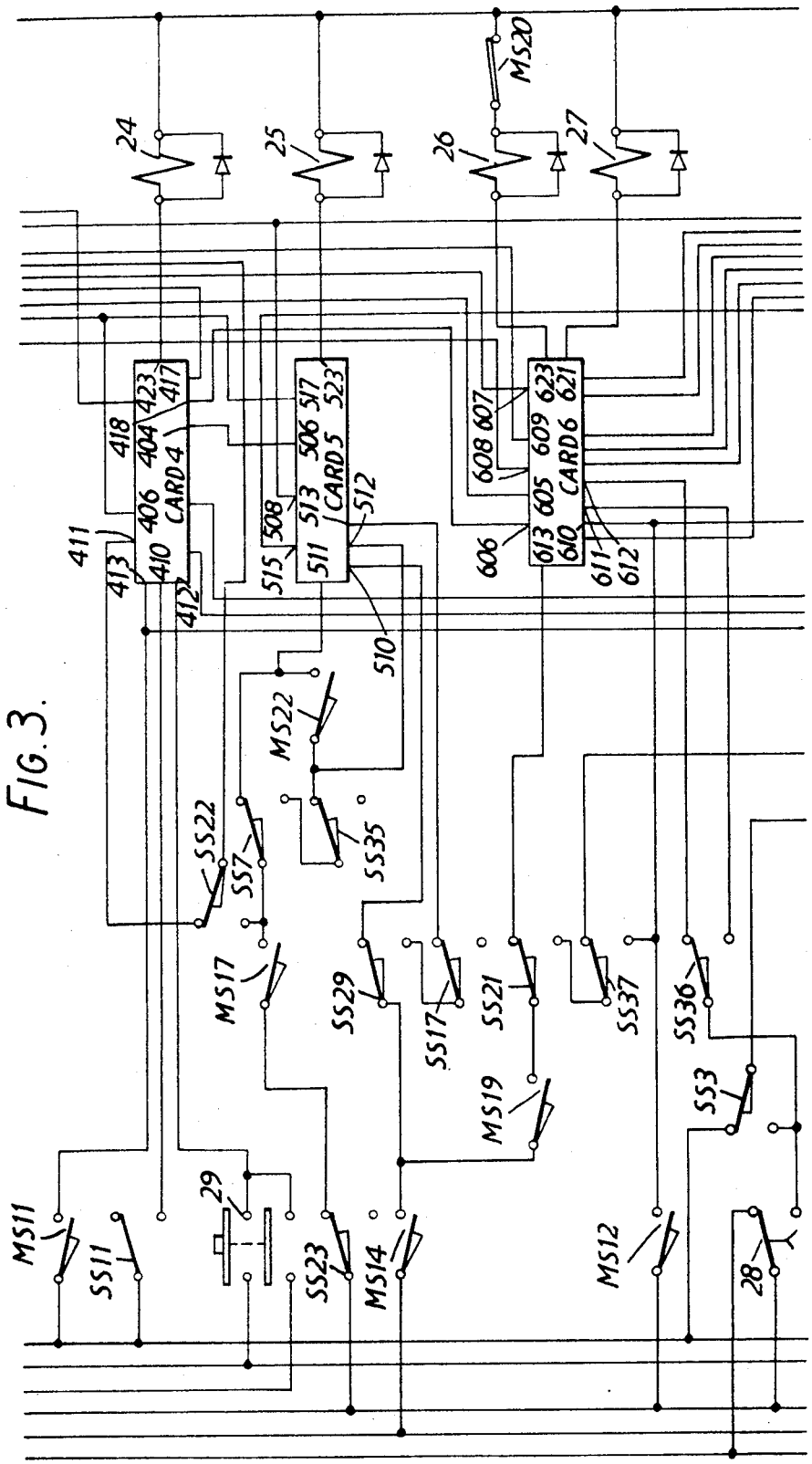
FIG. 3 is a circuit diagram illustrating part of the control circuits controlled by a sequence selector.
Figure 4:
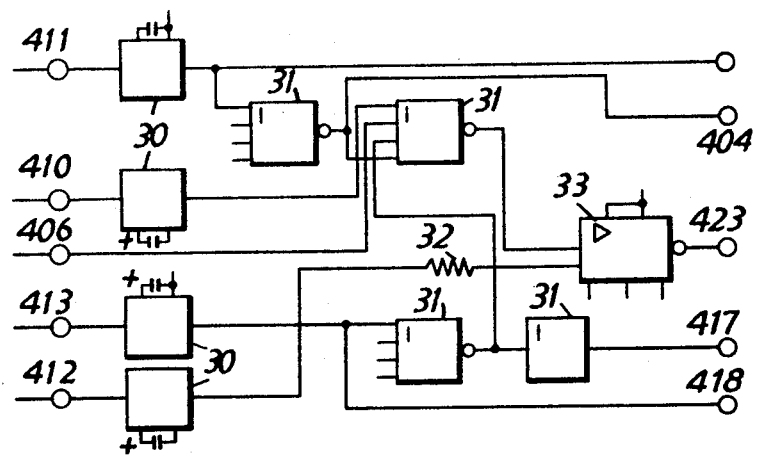
FIGS. 4, 5 and 6 are circuit diagrams of printed circuit cards incorporated in the circuit of FIG. 3.
Figure 5:
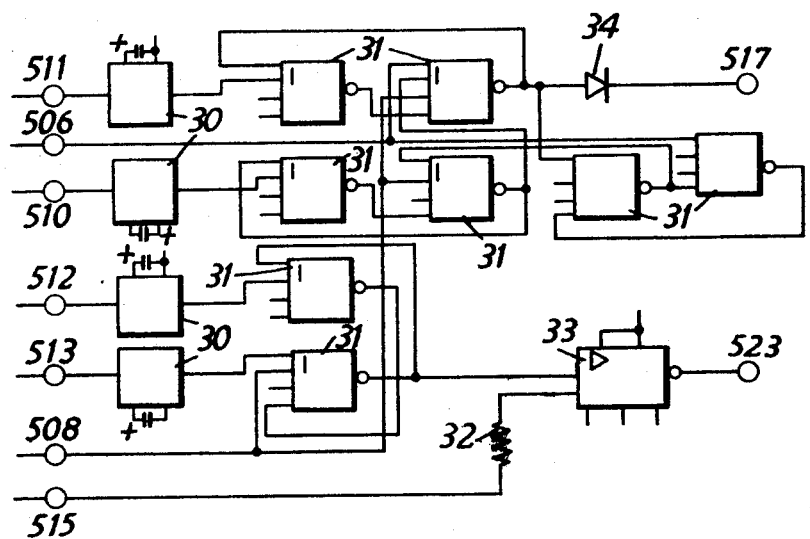
Figure 6:
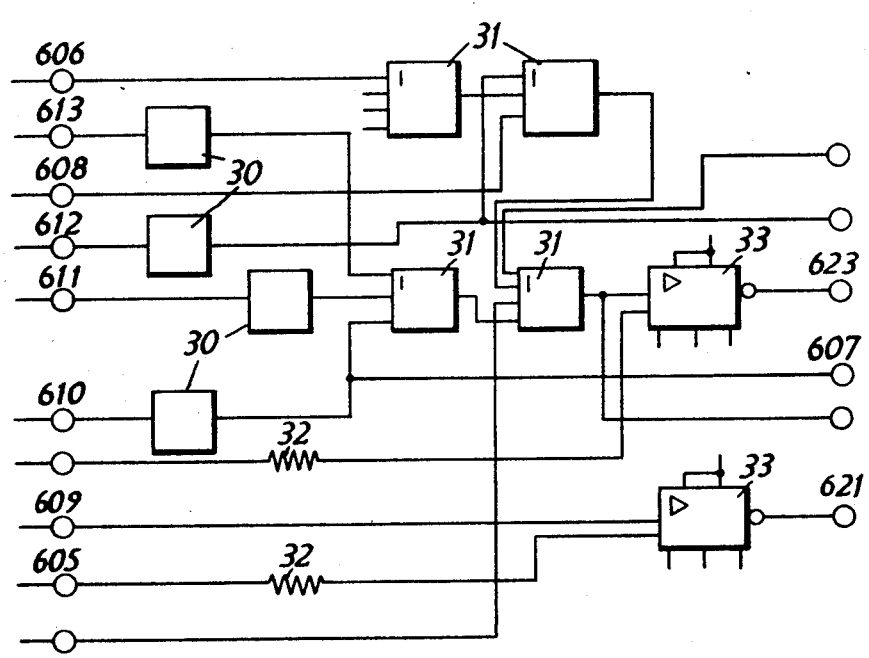

The printed circuit cards 23 are removably located in the rack 22 by means of edge connectors. Each printed circuit card 23 contains the necessary circuit components, for example, filters, logical elements, resistors and capacitors, amplifiers, and the like, for controlling a particular function or operation in a sequence of steps forming an injection moulding process. For example, one card controls the movement of the mould halves, another card controls the injection feed screw, a third card controls the ejection of a moulded article, and so on. If desired, more than one action may be controlled by a single card. For example, both the opening and the closing movements of the mould halves may be controlled by a single card. FIG. 3 shows part of the control circuit which controls the ejection system of the machine, and it includes three of the printed circuit cards 23, the circuits of which are respectively shown in FIGS. 4, 5 and 6. The cards 4, 5 and 6 control various actions which it is desired that the injection moulding machine of FIG. 1 shall perform. Circuit card 4 controls the operation of the ejection system, circuit card 5 controls the ejection sequences and circuit card 6 controls the operation of the dies.

Each circuit on a printed circuit card causes solenoid valves or pneumatic valves to control hydraulic valves operating the injection moulding machine, allowing particular sequences to operate with required timing. Certain variations in the control of the injection moulding machine may be effected by temperature controllers (of which the dials 18 are illustrated), digital setting timers 20, and the settable time delays 21 shown in the console illustrated in FIG 2. The construction and operation of such controls will be known to those skilled in the art.

It will be appreciated that the main control console for the machine will be wired for all possible actions which the machine may be required to perform. The control system of the invention simply selects which of all possible actions are to be performed in any one case and the order and timing of the actions.

The circuit of FIG. 3, in addition to circuit cards 4, 5, 6 includes solenoid operated valves 24, 25, 26, 27, located on the machine and respectively controlling ejectors, stripper, clamp and clamp pressure cut-off. Also located in appropriate places on the machine are various limit switches (MS) operated by movement or pressure to control the following functions:- core extraction (MS 11), core insertion (MS 12), ejectors return (MS 14), ejectors forward (MS 17), stripper out (MS 19), safety gate interlock (MS 20) and stripper in (MS 22). The circuit includes a series of selector microswitches SS 3, SS 7, SS 11, SS 17, SS 21, SS 22, SS 23, SS 29, SS 35, SS 36 and SS 37 and is completed by timer contacts 28 and press button manual ejector switch 29. Each of circuit cards 4, 5, 6 shown in FIGS. 4, 5, 6 respectively include filters 30, NOR logical elements 31, resistances 32 and power amplifiers 33. The card of FIG. 4 controls the operation of the ejectors and is connected into the circuit of FIG. 3 by terminals 404, 406, 410, 411, 412, 413, 417, 418 and 423. The card of FIG. 5 controls ejection sequences and the operation of the stripper and is connected into the circuit of FIG. 4 by terminals 506, 508, 510, 511, 512, 513, 515, 517 and 523, and also includes diode 34. The card of FIG. 6 controls the operation of the dies and is connected into the circuit of FIG. 3 613, terminals 605, 606, 607, 608, 609, 610, 611, 612, 6138 621 and 623.

The sequence selector unit shown in FIG. 7 comprises a plurality of microswitches (SS) each having an operating plunger 35 located towards one end. The microswitches are arranged in rows with the plungers 35 staggered alternately. The microswitches SS are mounted in a box 36 having a hinged lid 37 fitted with a catch 38. A plate 39 is mounted inside the lid 37 to carry four compression springs 40. The box 36 is adapted to receive a stiff key-plate 41 formed with apertures 42 which are each dimensioned so as to allow free passage of the plunger 35 of a microswitch SS. Three guide-holes 43 formed in the key-plate 41 are dimensioned and arranged to engage with three pins 44 in box 36, thus ensuring that the key-plate 41 can only be inserted in box 36 in its correct disposition. When key-plate 41 is placed in the box 36, the lid 37 closed and the catch 38 engaged, the springs 40 urge the key-plate 41 towards the microswitches SS to depress all the plungers 35 which are not located beneath any of the apertures 42. Thus the manner in which the apertures 42 are arranged in the key-plate 41 determines which microswitches are actuated and which are not and thus controls the selection of the sequence of operation of the machine.

FIG. 7 shows a key-plate 41 having a large number of holes 42 whereby only a minor proportion of the mircoswitches SS are actuated by depression of the plungers 35 when the key-plate 41 is inserted. It is preferred, however, to arrange the microswitches SS so that the circuit is closed when the plunger is not depressed, i.e., when a hole is provided in the key-plate to allow free passage of the plunger. This minimises the number of holes which must be cut to achieve a particular sequence of operation.

For example, if a key-plate is formed with holes so that the plungers of switches SS 7, SS 11 and SS 23 are not depressed, then the machine operates so that the ejectors go forward, operate and return immediately. If a key-plate is formed with holes so that the plungers of switches SS 7, SS 11, SS 23 and SS 29 are not depressed, then the ejectors move forward, back and then forward again for a second ejection. If a key card is formed with holes so that the plungers of switches SS 11, SS 17 SS 23 and SS 35 are not depressed, then strippers are also brought into play and in operation the ejectors move forward followed by the strippers, then the ejectors move back, again followed by the strippers.

This describes that part of the operation of an injection moulding machine concerning ejection, but the other operations of the machine, such as injection, core pulling, sprue break, closing, opening and other movements of the die, control of pressure, etc., together with safety interlocks can be controlled in the same way, using sequence circuits which are selected by the operation or non-operation of microswitches S when covered by a key-plate 41.

Although the invention has here been described in its application to the automatic control of an injection moulding machine, it can clearly be used in any automatic machine using selector switches to carry out a desired selection and/or sequence of a plurality of actions.

What is claimed is:

1. In combination with an automatic moulding machine, a control system comprising:
    a plurality of electronic timing and function control means for automatically controlling the duration and operational characteristics of a corresponding plurality of particular functions in a sequence of steps used in a moulding process,
    a plurality of binary switches electrically connected to operate respectively corresponding ones of said control means, and
    a removable selection member which when fully and fixedly inserted in place, cooperates with said binary switches to cause actuation of predetermined ones of said binary switches to thereby achieve a desired predetermined set of functions for a particular moulding process, the said selection member remaining in place to maintain said actuation of said switches during the entire moulding process.

2. Apparatus as in claim 1, wherein:
    said binary switches comprise microswitches arranged in an array, and
    said selector member is adapted to engage in the array of microswitches whereby some of the microswitches are operated and some are not operated thus effecting a selection of operations.

3. Apparatus as in claim 2, wherein:
    the microswitches are lever-operated, and
    the selector member is a card having a shaped profile.

4. Apparatus as in claim 2, wherein:
    the microswitches are lever-operated and are mounted in a row with their operating levers in line, and
    the selector member is a card having a shaped profile held in two slots so that its leading edge passes through the operating plane of the levers,
    the shaped profile being formed by cutting away parts of the leading edge so that it does not engage the levers of the switches which are not intended to be actuated.

5. Apparatus as in claim 2, wherein:
    the microswitches are plunger-operated and arranged with the plungers in one plane, and
    the selector member is a stiff plate provided with a number of apertures and arranged to be urged into contact with the switch array to depress the plungers of all the microswitches except the ones located against the apertures.

* * * * *